United States Patent Office 3,451,053
Registered June 17, 1969

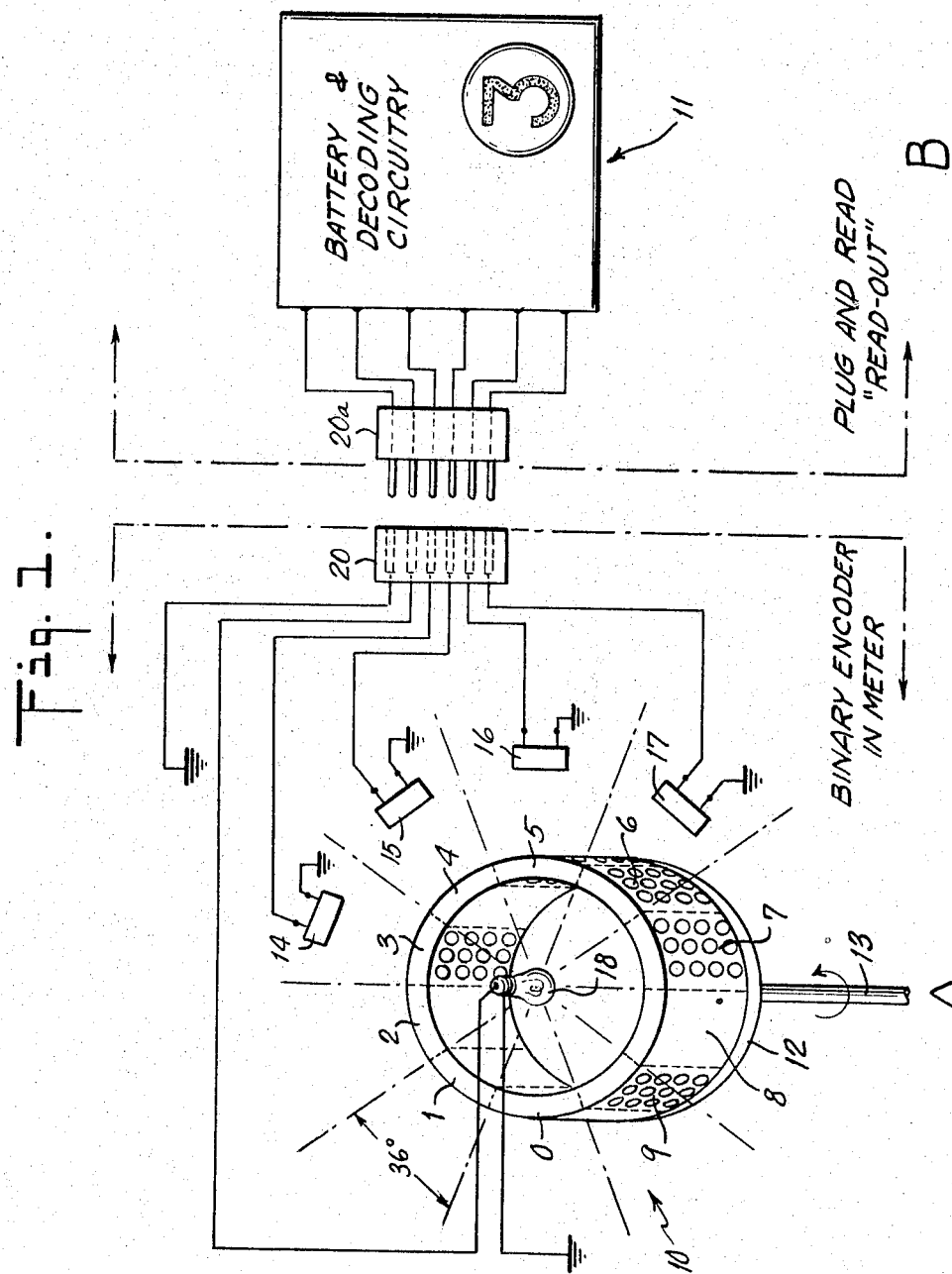

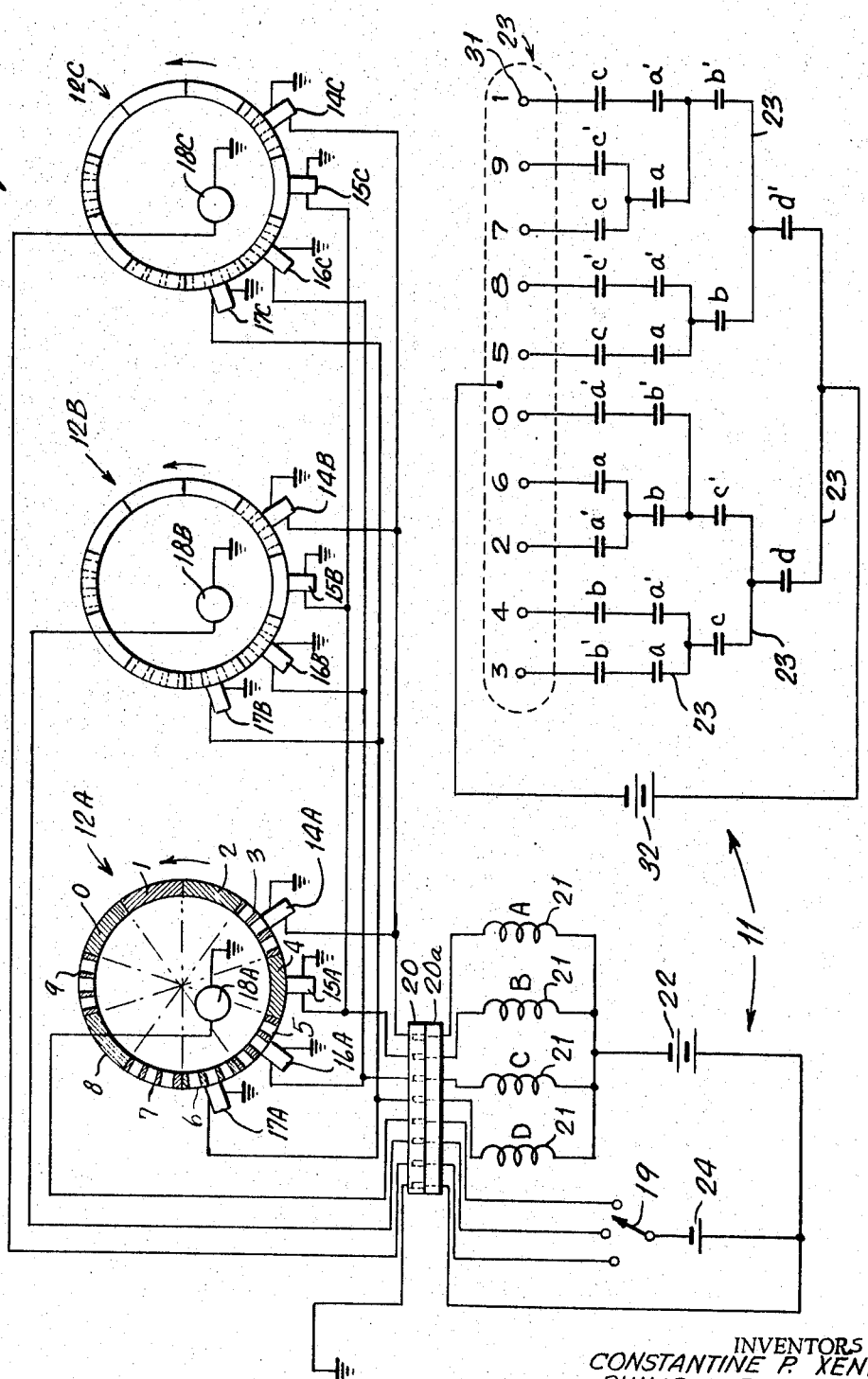

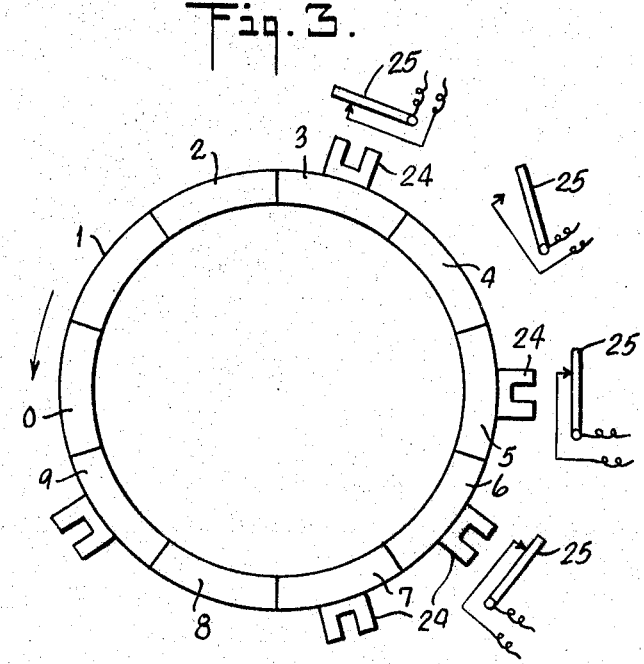

3,451,053
REMOTE POSITION SENSING AND
MEASURING DEVICE
Constantine P. Xenis, Douglaston, and Philip A. Phillippidis, Astoria, N.Y., assignors to Consolidated Edison Company of New York, Inc., New York, N.Y., a corporation of New York
Filed Jan. 11, 1965, Ser. No. 424,605
Int. Cl. H04l 3/00; H03k 13/02
U.S. Cl. 340—347                                   7 Claims

ABSTRACT OF THE DISCLOSURE

Binary encoder, having code arranged in single circumferential plane, affixed to each dial-shaft of a cyclometric type electric consumption meter for remote reading of the latter via a semi-automatic chain-relay type "read-out" device which is plug-connected to the encoder output. Encoder actuation is either by photocells, magnets, or reed-type switches. The encoder employs for novel "Geneva-spin" binary codes; particular disposition of five energizing areas on meter dial-shaft encoder with respect to four consecutively adjacent sensing stations; and for particulars of relay switch arrangement in read-out device.

---

This invention relates to remote position sensing and measuring devices for automatically providing information regarding the decimal position of a rotating shaft, and more partciularly to a device for sensing electrically the reading on household public utility meters and for permitting the reading of public utility meters at locations remote from the location of the meter.

For many years numerous devices have been suggested for dispensing with the conventional practice of having a meter reader periodically enter dwellings and other premises in order to read the utility meter. The problems and disadvantages inherent with having a meter reader actually enter the premises housing the utility meter are well-known to those skilled in this art and will not be enumerated. In general, the devices heretofore proposed for either dispensing with the need of meter readers or for providing meters which could be remotely read suffered from one or more disadvantages and problems which rendered them impractical. The reason for this is that any remote or automatic meter reader must be low in initial cost, small in size and require little or no maintenance.

In view of the foregoing, it is the primary object of the present invention to provide a device which will permit the remote reading of utility meters and which is simple, small and accurate.

A further object of the present invention is to provide a device for remotely reading utility meters which will permit a meter reader to obtain a visual indication of the dial positions on a utility meter without the need for actually entering the premises and inspecting the utility meter.

Yet another object of the present invention is to provide a device for remotely sensing and measuring a utility meter in which the utility meter has incorporated therein a binary encoder for converting the dial positions of the utility meter into an electrical signal which may be transmitted to a remote location where it can be selectively read.

These and further objects and features of the invention will appear from a reading of the following detailed description of one embodiment of the invention to be read in conjunction with the accompanying drawings wherein like parts in the several views are identified by the same reference numerals. In the figures:

FIGURE 1 illustrates schematically the principle of operation of the present invention, FIGURE 2 is an electrical representation of the operation of one embodiment of the present invention, FIGURE 3 illustrates the operation of another form of encoder, and FIGURE 4 illustrates the operation of an encoder such as illustrated in FIGURE 1 but with various parts reversed.

Briefly stated the present invention is of the type that can be categorized as a plug and read telemetering system. The public utility meters which are generally located within a dwelling are usually kilowatt hour meters and will hereinafter be referred to as kwh. meters. In the present invention the kwh. meter incorporates a binary encoder which is connected to a socket which is located on some exterior and accessible portion of the dwelling housing the kwh. meter. In this manner the meter reader visiting the location need not enter the dwelling but merely has to connect a portable read-out device to the socket connected to the binary encoder in the kwh. meter and this enables the meter reader to obtain a visual indication of the dial positions on the kwh. meter without the need for actually entering the premises and inspecting the kwh. meter.

The encoder that is attached to or formed integrally with the kwh. meter converts the dial positions of the kwh. meter into electrical signals. A rotating drum is provided for each dial position that it is desired to read, i.e. if it is desired to read in units of 1, 10 and 100 then three drums are provided. Each drum is circumferentially divided into equal segments and means are provided for detecting the decimal position of each drum. In order to accomplish this, each drum is divided into ten sequentially adjacent segments and the area of each segment is made perforate or imperforate to the passage of light depending upon a selected code. Thus, the code is arranged in a single circumferential plane, i.e., a single path extending about the circumference of the drum. As the drum changes from one decimal position to another a distinct and discriminating combination results. A read-out device is also provided for converting the information from the binary encoder into a visual read-out of the positions of the various dials of the kwh. meter.

Referring now to the figures and particularly to FIGURE 1, there is illustrated in schematic form therein one form of apparatus in accordance with the present invention. This apparatus basically consists of an encoder 10 illustrated in FIGURE 1A and a decoder 11 illustrated in FIGURE 1B. The encoder 10 is attached to or formed integrally with the kwh. meter, while the decoder 11 is adapted to be carried by the meter reader and plugged into a socket on the exterior of the dwelling containing the kwh. meter in order to give a visual indication of the reading on the kwh. meter.

The function of the encoder 10 is to convert the dial position of the kwh. meter into an electrical signal. The ordinary kwh. meter is equipped with three dials, a first dial for readings between 0 and 9, a second dial for readings between 10 and 100, and a third dial for readings between 100 and 1000. In the use of the present invention an encoder is required for each dial position to be read. If the kwh. meter is provided with four or five dials, the meter would also be equipped with four or five encoders if it is desired to read each dial position. The present invention, however, will be described only with the use of three encoders, but the principle remains the same for any number of encoders.

Each encoder 10 consists of a drum or cup 12 attached for rotation with a dial shaft 13 of the meter to be read. The shaft 13 is of a conventional cyclometric type, adapted to rotate intermittently in a pulsating manner and not continuously. The single plane code path defined by each drum 12 is divided into ten equal segment areas for encoding in accordance with a binary code which can be used in a manner to be described. In FIGURE 1 the equal segment areas of the code path are numbered consecutively from 0 through 9.

Positioned in a stationary manner about the periphery of the drum 12 are four circumferentially aligned photoconductive elements 14, 15, 16 and 17 that are spaced at consecutive intervals about the periphery of the drum 12 within the radially projected circumferential plane of the code path defined by the latter. For example, as illustrated in FIGURE 1, the photo-conductive elements 14, 15, 16 and 17 are positioned adjacent segments 3, 4, 5 and 6 of the drum 12, although it is to be understood that the photo-conductive elements 14 through 17 can be positioned at any location about the periphery of the drum 12, the only limitation being that the photo-conductive elements be positioned opposite consecutive segments of the drum 12. The location of the photo-conductive elements 14 through 17 about the periphery of the drum 12 does not alter the operation or function of the encoder 10 but merely alters the sequence of operation of the encoder 10 in a manner to be described.

As illustrated in FIGURE 1A, the drum 12 is divided into ten equal segments, and some of these segments are imperforate while others are perforate, the perforate sections permitting the passage of light while the imperforate sections do not. The perforate and imperforate sections of the drum 12 are determined by the particular code that is being utilized. A new code was evolved for use with this invention and for purposes of illustration the decimal numbers 0 to 9 may be represented symbolically by the following typical binary digit combinations:

| Decimal numbers: | Binary |
| --- | --- |
| 0 | 1001 |
| 1 | 1100 |
| 2 | 0110 |
| 3 | 0011 |
| 4 | 0001 |
| 5 | 1000 |
| 6 | 0100 |
| 7 | 1010 |
| 8 | 0101 |
| 9 | 0010 |

The foregoing code is designated as a sixteen-ones Geneva spin code since there are sixteen ones or conductive segments required in order to complete the code. A twenty-ones code is as follows:

| Decimal numbers: | Binary |
| --- | --- |
| 0 | 0001 |
| 1 | 0010 |
| 2 | 0101 |
| 3 | 1011 |
| 4 | 0111 |
| 5 | 1110 |
| 6 | 1101 |
| 7 | 1010 |
| 8 | 0100 |
| 9 | 1000 |

The feature of both the sixteen and twenty-ones codes is that the same reading is obtained both vertically and horizontally. For example, in the twenty-ones code the designation for the number 1 is 0010. This same designation is obtained by reading vertically downward in the first row commencing with the numeral 1 and including the numerals 2, 3 and 4. The same applies to the sixteen ones code but by reading vertically upward rather than downward. Thus, the vertically aligned four digit binary representation for any decimal number can be sensed by the order of energization or not of the four circumferentially aligned photo-conductive elements where the first column of either code is made to appear on the circumferentially extending code path defined by the drum 12.

In the twenty-ones binary code illustrated there are five 1's or conductive potrions and five 0's or non-conductive portions in the first column. In the utilization of this code, therefore, there would be five perforate and five imperforate segments on the drum 12. In the use of the device of the present invention the number of perforate and imperforate sections on the drum 12 is determined by the number of 1's and 0's in the first column of the code. In the sixteen-ones code there are four 1's and six 0's in the first column. The drum 12 would therefore have four perforate and six imperforate sections or six perforate and four imperforate sections.

The perforate and imperforate sections on the drum 12 are therefore determined by the sequence in the first row of the code. For example, in the twenty-ones code referred to above, the first row has 1's at numbers 3, 5, 6, 7 and 9, and the corresponding segments on the drum 12 would be perforate or imperforate but the opposite of the other segments. In the code selected the 1's refer to the conductive portions and therefore in the first column wherever 1's appear the corresponding segments are made perforate, i.e. allow light to penetrate.

The interior of each drum 12 has positioned therein a light source 18 which is energized or lit only when a reading of the kwh. meter is desired. When the light 18 is lit, light from the lamp 18 will flow through the perforate portions of the drum 12. If at any particular instant therefore a perforate section is opposite one of the photo-conductive elements 14 through 17, the photo-conductive element will, of course, be energized. The manner in which this function is utilized in the present invention will be described hereinafter.

As can be seen, therefore, the encoder 10 consists of a drum 12 which rotates intermittently. The drum 12 is divided into ten sectors, the sectors being either perforate or imperforate depending upon the code selected. The drum 12 has positioned about the periphery thereof in adjacent sectors four photo-conductive elements 14, 15, 16 and 17 and it will be noted that the number of photo-conductive elements corresponds to the number of binary digits in the aforementioned binary codes. Positioned interiorly of the drum 12 is a light 18 which energizes a particular photo-conductive element if a perforate element of the drum 12 is adjacent the photo-conductive element at the time when the light is energized. If an imperforate section of the drum 12 is adjacent the photo-conductive element when the light 18 is energized, that particular photo-conductive element is not energized.

It is to be understood that in place of the photo-conductive elements 14, 15, 16 and 17 any other elements can be used which will make or break a circuit, such as magnets, photo-cells, reed switches, etc. If, for example, it is desired to use a combination of magnets and switches rather than a combination of a lamp and photo-conductive elements, the magnets would be positioned on the drum 12 in the sectors thereof which would be perforate, i.e. in FIGURE 1A, the magnets 24 would be placed on segments 3, 5, 6, 7 and 9. This is illustrated in FIGURE 3. The switches 25 would be positioned in the same locations as those occupied by the photo-conductive elements 14, 15, 16 and 17. The switches 25 would be normally open and would be closed when a magnet 24 is opposite that particular switch. This operation would, of course, be the same as that illustrated in FIGURE 1.

It is also to be understood that the positions of the lamp 18 and the photo-conductive elements 14 through 17 in FIGURE 1, could be reversed. In other words, the lamp 18 could be replaced by one of the photo-conductive elements 14 through 17. The photo-conductive elements 14 through 17 would each be replaced by a lamp. The operation of such a system would be just the reverse of that described with reference to the encoder illustrated in FIGURE 1. Such a system is illustrated in FIGURE 4 with the photo-conductive element being numbered 26 and the lamps numbered 27 through 30.

The operation of the invention will be described with reference to the apparatus illustrated in FIGURE 2. It will be assumed for purposes of this description that it is desired to read three units on the kwh. meter, and for this reason three drums are necessary which are labeled respectively 12A, 12B and 12C. As described previously, each drum has associated with it four photo-conductive elements or other selectively energizable means such as switches. These photo-conductive elements or switches are identified by the numbers 14 through 17 together with the prefix A, B or C, depending upon the particular drum with which they are associated. In addition, each drum 12 has positioned therein a light source 18.

Since the lights 18 inside of each drum 12 will be lit individually and sequentially rather than simultaneously, it is possible to connect all of the photo-conductive elements 14 through 17 in parallel. If it is intended that more than one drum 12 will be energized at a time, it is not possible to connect the photoconductive elements 14 through 17 in parallel because of the possibility of interference being created between the various drums.

In the apparatus illustrated in FIGURE 2 a switch 19 is provided for sequentially lighting the lights 18A, 18B and 18C. For this reason it is possible to place the photoconductive elements 14 through 17 associated with each drum 12 in parallel. With a device such as shown in FIGURE 2 therefore, it is only necessary to have an 8-wire transmission cable running from the kwh. meter to some socket 20 exterior of the dwelling, i.e. the point at which the meter reader will connect the decoder 11 in order to obtain a reading from the kwh. meter. The 8-wires consist of four wires for the photo-conductive elements 14 through 17 that are connected in parallel, one wire for each of the lights 18A, 18B and 18C, and one common return. If the switch 19 were not used, and the lamps 18A, 18B and 18C were to be lit other than sequentially, the photoconductive elements 14 through 17 associated with the various drums 12 could not be placed in parallel and rather than an 8-wire transmission system a 13-wire transmission system would be needed, that is, one wire for each photo-conductive element and one common return.

The decoder 11 is also provided with a socket 20a for interconnection with the socket 20. In the decoder 11 a relay 21 is provided for each photo-conductive element 14 through 17. Since in the embodiment illustrated in FIGURE 2 the phot-conductive elements associated with each drum 12 are connected in parallel, only four relays 21 are necessary. In the system wherein the photo-conductive elements associated with each drum 12 are not placed in parallel, one relay would have to be provided in the decoder 11 for each photo-conductive element. The relays 21 in the decoder 11 are connected in parallel and in a circuit including a battery 22. The switch 19 is also connected in a circuit containing a battery 24 for energizing the lights 18.

In FIGURE 2, the relays 21 have been designated as A, B, C and D, the relay 21A in the decoder 11 is associated with photo-conductive element 14 on each drum 12, and the other relays 21 are accordingly associated with the other photo-conductive elements 15, 16 and 17. In addition, each relay 21 has associated with its contacts in the decoder circuit 23. For example, the relay 21A has associated with it contacts 23a and 23a'. When relay 21A is energized contacts 23a closed and contacts 23a' are opened. Conversely when relay 21A is not energized contacts 23a are open and contacts 23a' are closed. In a similar manner relay 21B has associated with it contacts 23b and 23b'. Also relays 21C and 21D have the same association with their respective contacts in the decoder circuit 23.

In the apparatus illustrated in FIGURE 2, it is assumed that each dial on the kwh. meter is reading 3, i.e. that drums 12A, 12B and 12C are each reading 3, so that the reading on the kwh. meter would be 333. It can be seen by reference to the twenty-ones spin code that the numeral 3 is designated by the code 1011.

In operation the meter reader will connect the socket 20a of the decoder 11 to the socket 20 connected with the encoder 10. The switch 19 would then be selected to energize, for example, light 18A in drum 12A. It can be seen that photo-conductive element 14A, will be energized since it is opposite a segment 3 of the drum 12 which is perforate and therefore allows light from the lamp 18A to reach the photo-conductive element 14A. Thus, the relay 21A is energized. In a similar manner photo-conductive elements 16A and 17A would also be energized since they are opposite respectively segments 5 and 6 of the drum 12, which are also perforate and therefore allow light from the lamp 18A to reach the photo-conductive elements 16A and 17A. Thus, the relays 21C and 21D are also energized. It can be seen, however, that the photo-conductive element 15A is opposite segment 4 of the drum 12 which is imperforate and therefore does not allow light from the lamp 18A to reach and energize the photo-conductive element 15A. Since the photo-conductive element 15A is not energized, the relay 21B associated therewith is also not energized.

Since the relay 21D has been energized, contacts 23d would be closed. This, of course, is due to the fact that the photo-conductive element 17A associated with relay 21D is opposite a segment that is a 1 or perforate to the passage of light. Since contacts 23d are closed all of the circuitry after contacts 23d can be energized. Contacts 23d', however, will be open since relay 21D is energized. This, of course, means that the circuitry after contacts 23d' cannot be energized.

The contacts after contacts 23d are contacts 23c and 23c'. Since relay 21C is energized, contacts 23c will be closed and contacts 23c' will be open. This of course means that the circuitry after contacts 23c' cannot be energized while the circuitry after contacts 23c can be energized.

The contacts following contacts 23c are contacts 23a and 23a'. Since relay 21A is energized contacts 23a will be closed while contacts 23a' will be open.

This again means that the circuitry after contacts 23a' cannot be energized while the circuitry after contacts 23a can be energized.

The contacts following contacts 23a are contacts 23b'. Since relay 23B is not energized, contacts 23b' will be closed.

The decoder 11 is provided with a read-out unit 23. The read-out unit 23 contains elements 31 in the configuration of the numerals 0 through 9. The anodes of each of these configurations are connected in common such that as the cathodes of each of these configurations are individually connected, the individual lights will be lit by the battery 32. In the case illustrated in FIGURE 2, the cathode of numeral 3 is connected through the circuit for the reason described above and is thereby energized and lit. This is also true in FIGURE 1.

Once a reading has been obtained for drum 12A, the switch 19 is shifted to energize the light 18B in drum 12B and once a reading is obtained for drum 12B the same is done in order to obtain a reading of drum 12C. It is to be noted, however, that with the apparatus illustrated in FIGURE 2, although it is necessary to only have one read-out unit 23, it is necessary that each drum 12 be lit sequentially and a reading obtained. If it is desired to have a reading that simultaneously indicates the value of all three drums 12, it is simply necessary to install some sort of a timing element which will sequentially energize each of the drums 12.

It is to be noted that with the code of the present invention the four variables 0000 combination has been purposely avoided. Such an indication therefore would serve as an indication of a lamp failure or a loss of continuity in the circuitry. The code of the present invention is a single plane code.

What is claimed is:

1. Apparatus for determining the angular position of an intermittently rotatable shaft, comprising a drum on said shaft for rotation therewith and defining but one circumferentially extending single code path, a plurality of sensing elements in fixed position adjacent to the periphery of said drum and in tandem-aligned spaced apart relation to each other substantially within the radially projected circumferential plane of said code path, said code path having along its length a plurality of equal segment areas in sequentially adjacent relation to each other, said sensing elements being disposed adjacent to respective ones of said segment areas when any said sensing element and any said segment area are adjacent to each other, selected ones of said segment areas having means for energizing any said sensing element to which it is adjacent, said selected, ones of said segment areas being selected with respect to said fixed positions of said sensing elements whereby, as said drum is intermittently rotated such that each said segment area is successively positioned and stopped adjacent to one of said sensing elements as a reference, the order of energization or not of all of said sensing elements together establishes a plural digit binary representation identifying that segment area which is so positioned, all such binary representations being different from each other whereby a binary code for a like numbered position sequence of said shaft is established, the plurality of said digits in each said plural digit binary representation corresponding to said plurality of sensing elements.

2. Apparatus according to claim 1 wherein said code path has a total of ten said segment areas, and said plurality of sensing elements consists of four sensing elements respectively positioned adjacent to four consecutively adjacent segment areas.

3. Apparatus according to claim 2 wherein said selected ones of said segment areas consists of the first, fifth, seventh and tenth segment areas in said sequence thereof, whereby said binary code is as follows:

| Decimal numbers: | Binary |
|---|---|
| 0 | 1001 |
| 1 | 1100 |
| 2 | 0110 |
| 3 | 0011 |
| 4 | 0001 |
| 5 | 1000 |
| 6 | 0100 |
| 7 | 1010 |
| 8 | 0101 |
| 9 | 0010 |

4. Apparatus according to claim 2 wherein said selected ones of said segment areas consists of the third, fifth, sixth, seventh and ninth segment areas in said sequence thereof, whereby said binary code is as follows:

| Decimal numbers: | Binary |
|---|---|
| 0 | 0001 |
| 1 | 0010 |
| 2 | 0101 |
| 3 | 0000 |
| 4 | 0111 |
| 5 | 1110 |
| 6 | 1101 |
| 7 | 1010 |
| 8 | 0100 |
| 9 | 1000 |

5. In a public utility consumption meter having a plurality of intermittently rotatable dial shafts each representative of a different integer of the consumption measurement displayed by the meter, the improvement comprising means for determining the respective angular positions of all of said shafts, said means comprising a drum on each of said dial shafts for rotation therewith, said drums respectively defining but one circumferentially extending single code path associated with each said dial shaft, a group of four sensing elements in fixed position adjacent to the periphery of each said drum, the four sensing elements in each of said sensing element groups being disposed in tandem-aligned spaced apart relation to each other substantially within the radially projected circumferential plane of said code path defined by the drum with which said group of sensing elements is associated, said code path of each said drum having along its length ten equal segment areas in sequentially adjacent relation to each other, said four sensing elements associated with each said drum being respectively disposed adjacent to respective ones of said segment areas of the drum code path when any one of the four sensing elements and any one of said associated segment areas are adjacent to each other, selected ones of said ten segment areas associated with each said drum having means for energizing any of its said associated sensing elements to which it is adjacent, said selected ones of said segment areas associated with each said drum being selected with respect to said fixed positions of its said four associated sensing elements whereby, as the drum is intermittently rotated such that each said segment area is successively positioned and stopped adjacent to one of said sensing elements as a reference, the order of energization or not of all of said sensing elements associated with said drum together establishes a four digit binary representation identifying that segment area which is so positioned, all such binary representations identified with each said drum being different from each other whereby a binary code is established for a like numbered position sequence of the dial shaft with which said drum is associated, and conductor means connected to all of said sensing elements for conducting to said remote location signals representative of said energization or not of each said sensing element, respectively.

6. The improvement according to claim 5 wherein each of said four sensing elements associated with each of said dial shaft drums comprises a photo-conductive element, and said energizing means on said selected ones of said segment areas of each said drum comprises means permitting the passage of light through the segment area, each of said drums having lamp means therein.

7. The improvement according to claim 5 wherein each of said four sensing elements associated with each of said dial shaft drums comprises a magnetically actuated switch, and said energizing means on said selected ones of said segment areas of each said drum comprises a magnet.

References Cited

UNITED STATES PATENTS

| 2,575,342 | 11/1951 | Gridley | 340—347 |
| 2,855,585 | 10/1958 | Quinby | 340—347 |
| 2,921,204 | 1/1960 | Hastings et al. | 340—347 |
| 3,021,518 | 2/1962 | Kliman et al. | 340—347 |
| 3,188,626 | 6/1965 | Palmer | 340—347 |

MAYNARD R. WILBUR, *Primary Examiner.*

GARY R. EDWARDS, *Assistant Examiner.*

PO-1050
(5/69)

UNITED STATES PATENT OFFICE
CERTIFICATE OF CORRECTION

Patent No. 3,451,053  Dated June 17, 1969

Inventor(s) C.P.Xenis et al.

It is certified that error appears in the above-identified patent and that said Letters Patent are hereby corrected as shown below:

Column 1, line 21, after "employs" and before "novel", delete "for".

Column 5, line 53, after "the", read --photo-conductive

Column 7, line 22, after "selected" delete the comma.

Column 7, line 66, numerals "0000", read --1011--.

SIGNED AND
SEALED

SEP 30 1969

(SEAL)
Attest:

Edward M. Fletcher, Jr.
Attesting Officer

WILLIAM E. SCHUYLER
Commissioner of Pat